United States Patent

McKee

[15] 3,675,771

[45] July 11, 1972

[54] PROCESS AND SYSTEM FOR CONTROL OF FLUIDS IN WATER DISPOSAL SURGE TANKS

[72] Inventor: Horace L. McKee, Corpus Christi, Tex.
[73] Assignee: Mobil Oil Corporation
[22] Filed: May 23, 1969
[21] Appl. No.: 827,224

[52] U.S. Cl. ................................210/83, 210/242
[51] Int. Cl. .......................................B01d 21/00
[58] Field of Search ....................210/242, 121, 83

[56] References Cited

UNITED STATES PATENTS

| | | | |
|---|---|---|---|
| 882,030 | 3/1908 | Traulsen et al. | 210/242 |
| 882,195 | 3/1908 | Gran | 210/242 |
| 2,661,094 | 12/1953 | Stewart | 210/242 |

*Primary Examiner*—Reuben Friedman
*Assistant Examiner*—T. A. Granger
*Attorney*—William J. Scherback, Frederick E. Dumoulin, William D. Jackson, Andrew L. Gaboriault and Sidney A. Johnson

[57] ABSTRACT

This specification discloses a water-disposal process and system which includes a surge tank in which oil is automatically withdrawn from an oil phase on top of the water at a rate to maintain a constant oil blanket on the water. The oil is withdrawn through a conduit which is secured to a buoy which floats at the oil-water interface. The buoy thus supports the oil inlet of the conduit a fixed distance above the oil-water interface to maintain the thickness of the oil phase constant as the water level varies within the tank. The tank further comprises means for alternately filling and emptying the tank of water between predetermined upper and lower levels. The sides of the tank between these levels are thus contacted with the oil phase to provide corrosion protection.

3 Claims, 2 Drawing Figures

3,675,771

PATENTED JUL 11 1972

HORACE L. McKEE
INVENTOR

BY William D. Jackson
ATTORNEY

PROCESS AND SYSTEM FOR CONTROL OF FLUIDS IN WATER DISPOSAL SURGE TANKS

BACKGROUND OF THE INVENTION

This invention relates to the control of fluids in the surge tank of a water disposal system and more particularly to the regulation of the oil phase within the tank to maintain a constant blanket of oil on top of the water and yet prevent withdrawal of such oil from the tank with the water as it is directed to a water disposal zone.

It is oftentimes necessary to dispose of large quantities of water. For example, in many oil fields large volumes of water are produced with the oil from the wells. This water often has a high salt content and normally cannot be allowed to drain into fresh water surface streams because of the problems presented by contamination. Thus, oil producers are compelled to dispose of such water by techniques which will not damage the surrounding area. The water may be drained into storage sumps or ponds where it evaporates or seeps into the subsoil. Alternatively, the water may be injected into wells leading to subterranean formations below the fresh water level.

In distributing the water to the appropriate disposal zone, the water normally is first accumulated in a surge tank. The water then is withdrawn from the surge tank, either continuously or intermittently, and passed to the disposal zone. Several problems are attendant to the use of such surge tanks. Corrosion of the tank is severe, particularly where the water contains dissolved salts. In order to protect against such corrosion, it is a common practice to maintain a "gas blanket" of a nonoxygen containing gas, e.g., natural gas, over the water. While this technique has met with some success in alleviating corrosion, certain safety hazards are present since the tank must be a closed system without vents to the atmosphere. In addition, the water to be disposed of often contains small amounts of oil. This oil because of its relatively low density rises to the top of the water where it forms a separate oil phase. Over a period of time, particularly if the treating system upstream of the surge tank fails to operate properly such that the water has an unusually large oil content, the oil phase may increase from a desired thickness of several inches to several feet or more. This excess oil should be bled off in order to prevent withdrawal of the oil with the water since it usually will be desirable to avoid introducing this oil into the water disposal zone. For example, where the disposal zone is a subterranean formation, the introduction of oil into the formation with the water may result in a decrease in the relative permeability of the formation to water. In some cases, this permeability reduction may be so severe as to plug the formation, thus making the well unsatisfactory for water disposal purposes.

SUMMARY OF THE INVENTION

In accordance with the present invention, there is provided a new and improved process and system for the disposal of water containing small amounts of oil. The water is introduced into a surge tank where it separates into a lower water phase and an upper oil phase in accordance with conventional practice. As water accumulates within the tank, it is withdrawn from the tank under conditions such that the height of the interface between the oil and water phases varies within the tank. This is accomplished by intermittently allowing the tank to fill with water to an upper level therein and then withdrawing water from the tank at a rate sufficient to lower the interface to a lower level within the tank. In addition, oil is separately withdrawn from the oil phase within a tank at a location above the oil-water interface and at a rate such that the thickness of the oil phase remains constant as the height of the oil-water interface varies within the tank. By this technique, an oil blanket is constantly maintained over the water in order to alleviate corrosion of the tank and, in addition, oil is automatically drained from the tank in order to avoid a large oil accumulation therein which is subject to withdrawal with the water to the water disposal zone.

In a further aspect of the invention, there is provided a preferred system which may be used to carry out the above-described method. In addition to the means by which the water is withdrawn from the surge tank, the tank is provided with a conduit which extends from the interior to the exterior of the tank. This conduit has an inlet in fluid communication with the interior of the tank such that oil may be separately withdrawn through the conduit. The system further comprises means for maintaining the conduit inlet at a fixed distance above the interface between the oil and water phases. Such means comprises a buoy to which the conduit is secured. The buoy has a density between the densities of oil and water and is adapted to float at the interface between the oil and water phases to support the conduit inlet above the interface. Thus, the thickness of the oil phase remains constant even though the elevation of the water column within the tank varies.

DESCRIPTION OF SPECIFIC EMBODIMENTS

Figure 1:
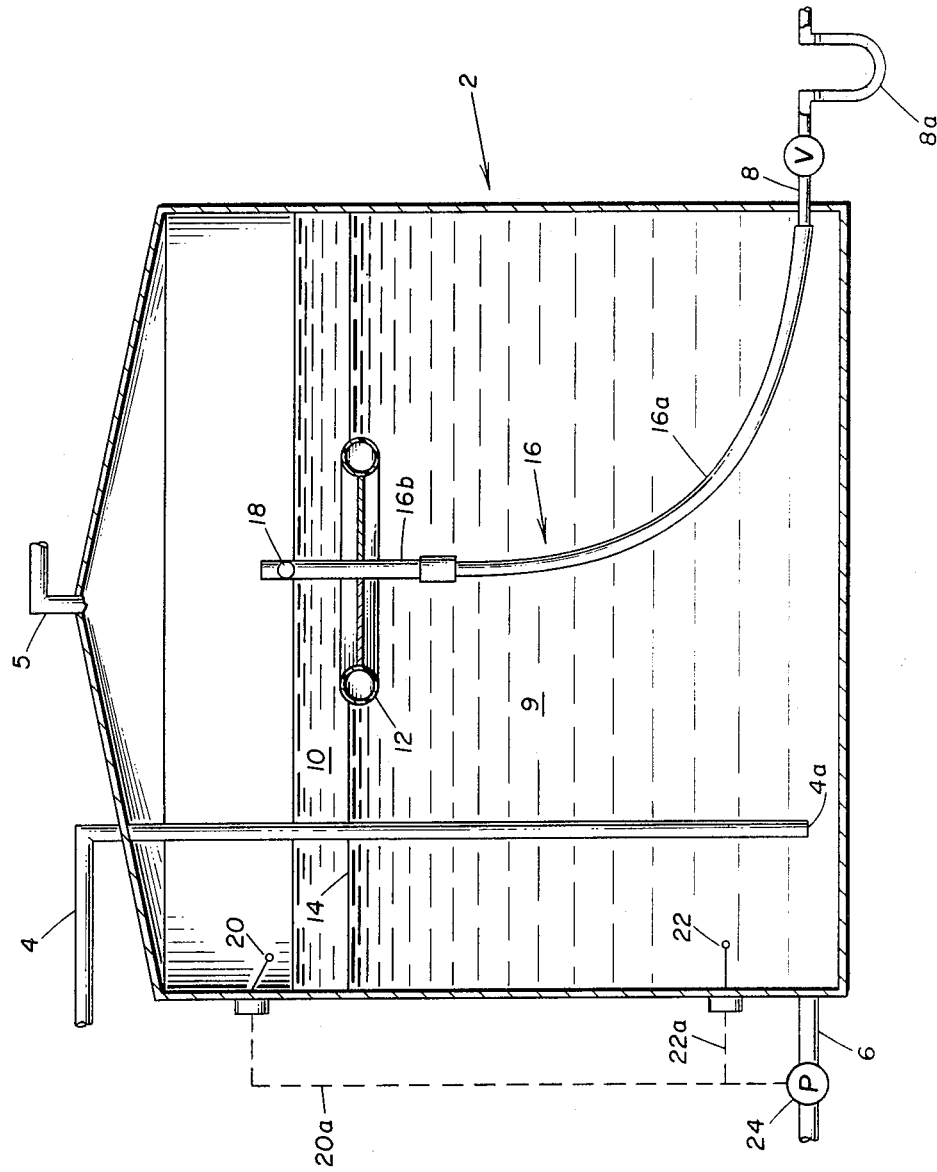
FIG. 1 is an illustration partly in section showing a water distribution system including a surge tank equipped in accordance with the present invention.

With reference to FIG. 1, there is illustrated a water distribution system embodying the present invention. The system comprises a surge tank 2 equipped with a water inlet line 4, a vent 5, a water outlet line 6, and an oil outlet line 8. The tank 2 is shown as partially filled with a column of water 9 and a layer of oil 10 which floats on top of the water. In accordance with the present invention, the tank also is equipped with a buoy 12 of a density such that it floats at the interface 14 between the oil and water phases. A conduit 16 is connected to the buoy and extends to the oil outlet line leading from the tank. The conduit 16 has an oil inlet 18 adjacent the upper end thereof. As oil accumulates in the oil layer it flows into this inlet and drains through conduit 16 into the oil outlet line 8 which forms a continuation of this conduit.

The oil thus withdrawn from the surge tank is passed through line 8 to a suitable oil collection zone such as a storage tank (not shown). As the oil is accumulated in this tank it may be withdrawn therefrom and passed to a treating facility. In order to minimize the passage of gas between the surge tank 2 and the oil storage tank, it is preferred to provide line 8 with a gooseneck as indicated in FIG. 1 by reference character 8a. The liquid seal within gooseneck 8a will prevent the passage of air through conduit 16 to the storage tank or, if the surge tank is a closed system employing a natural gas blanket, the loss of the gas blanket to the storage tank.

In operation of the system shown in FIG. 1, water is introduced into the tank via line 4. As the water accumulates within the tank, the oil rises to the surface where it forms the separate oil phase 10. Water is withdrawn from the tank through outlet 6 and then passed to a suitable disposal zone such as a water injection well (not shown). As the oil rises to the surface of the water, it is automatically drained from the tank via conduit 16. As can be seen from an examination of FIG. 1, the buoy 12 supports the conduit inlet 18 a fixed distance above the interface 14. The oil thus is automatically drained from the tank at a rate as is necessary to provide a constant thickness of the oil phase as determined by the elevation of the conduit inlet 18 above the oil-water interface. Accordingly, oil is prevented from accumulating within the tank in such large amounts such that it may ultimately overflow or be withdrawn from the tank along with the water which is passed to the water disposal zone. The oil phase will automatically be maintained at the desired thickness regardless of fluctuations of the water level within the tank. Thus, a continuous blanket of oil is provided over the water. This blanket of oil serves as a corrosion protection cover which prevents aeration of the water with oxygen from the atmosphere. In addition, as the water level within the tank varies, the oil leaves a film along the sides of the tank, thus further protecting the tank from corrosion.

The oil blanket provides corrosion protection throughout that portion of the tank which is occupied by the water, and assuming that corrosion of the roof and upper wall surfaces of the tank is not a problem, the tank may be open to the atmosphere through vent 5. However, a gas blanket may be employed if corrosion above the portion of the tank protected by the oil phase 14 is severe. In this case, vent 5 will be normally closed and provided with a vacuum-relief regulator valve (not shown). This regulator valve will function to open the vent if an excessive vacuum occurs within the tank.

As illustrated in FIG. 1, the conduit 16 comprises a section of flexible hose 16a which is connected to a nipple 16b on the interface buoy 12. The buoy is of a density between the oil and water densities such that it will float at the interface 14 when supporting the conduit. Thus, as the height of the water column 9 is raised or lowered within the tank, the buoy will stay at the oil-water interface 14. The conduit inlet 18 will therefore remain at a substantially fixed distance above the interface 14 with only such minor variations as may occur when the buoy shifts position slightly due to changes in the amount of the conduit 16 which is supported by the buoy.

Figure 2:
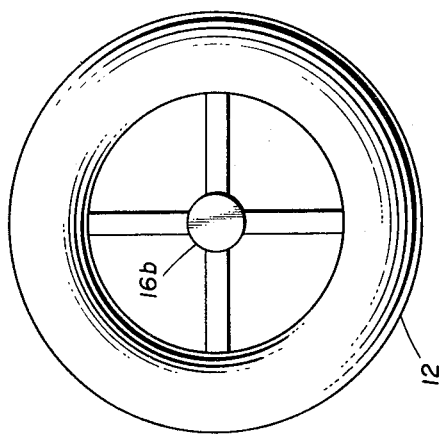
FIG. 2 is a plan view of an interface buoy shown in FIG. 1.

As is best shown in FIG. 2, it is preferred that the buoy 12 have an annular configuration with the upper portion of conduit 16, i.e., nipple 16b, extending through the interior opening. This configuration provides a stable support for the conduit and, in addition, is less likely to hang on "deadwood" in the tank. The buoy may also be guided by wires extending from bottom to top of the tank.

The buoy may be formed of a thin wall metal or plastic hollow member which is loaded with a liquid such as water, and/or has weights added, in order to give it the proper density. If loaded with liquid, the buoy should be substantially full in order to avoid instability.

It is desirable in practicing the invention to vary the rate of water withdrawal from the tank in order to move the oil phase 10 vertically throughout a substantial portion of the tank so that the sides of the tank within this interval are repeatedly contacted with oil. Thus, in a preferred embodiment of the invention, the tank is provided with means for alternately allowing the tank to fill with water to a predetermined upper level and thereafter draining water from the tank until the water reaches a predetermined lower level within the tank. More particularly, and with further reference to FIG. 1, the tank is provided with upper and lower level sensing means of any suitable type. In the embodiment shown, the level sensing means take the form of upper and lower float switches 20 and 22, respectively. These switches are connected through suitable control circuitry indicated by broken lines 20a and 22a to a pump 24 located in the water outlet line 6.

As illustrated in FIG. 1, the tank is shown in a filling cycle in which water is allowed to accumulate in the tank. In this cycle, pump 24 is shut off such that no water is withdrawn through line 6. The pump remains off until the water rises to the level at which float switch 20 is actuated. Pump 24 then is started and functions to withdraw water from the tank at a rate greater than the rate of introduction through line 4. The pump continues operating until the water reaches the lower level at which float switch 22 is activated to shut down the pump. Thereafter, the pump remains off until the water again reaches a level sufficient to actuate float switch 20. As will be recognized from the foregoing description, the oil level will be repeatedly moved throughout the section of the tank between the float switches 20 and 22, thus providing a protective film which will retard corrosion of the tank.

It is to be recognized that the water may be withdrawn from the tank by gravity drainage. In this case the float switches 20 and 22 may be employed to regulate a valve (not shown) in line 6 rather than pump 24.

In addition, the inlet line 4 may be provided with a valve (not shown) which is regulated by switches 20 and 22 in order to close off the flow of water into the tank while it is draining. Also, the float switches may be responsive either directly to the oil-water interface 14 or to the top of the oil blanket 10. In the latter case, particular care should be taken to locate switch 22 above the water outlet 6 by a distance greater than the thickness of oil layer 10 in order to ensure that oil is not withdrawn through line 6. The water inlet line should open into the tank at a position below the oil-water interface 14 in order to avoid agitation of the oil phase. Thus, it is preferred to locate the open end 4a of line 4 below float switch 22 so that the point of water entry remains below the water surface when it reaches the lower level within the tank.

What is claimed is:

1. In a method for the disposal of water, the steps comprising:

introducing water containing oil into a surge tank and accumulating said water within said tank whereby it separates into a lower water phase and an upper oil phase, withdrawing water from said water phase within said tank at a first location below the interface of said oil and water phases under conditions such that the height of said interface varies within said tank, separately withdrawing oil from said oil phase within said tank through a conduit having an inlet supported above said oil-water interface by a buoy having a density between the densities of oil and water whereby said buoy floats at the oil-water interface and the oil is withdrawn through said conduit inlet at a rate to maintain the thickness of said oil phase constant as the height of said interface varies, and intermittently withdrawing said water from said tank at a rate sufficient to lower said interface to a level adjacent the bottom of said tank and thereafter allowing water to accumulate in said tank until said interface reaches a level adjacent the top of said tank.

2. In a water-disposal system, the combination comprising:

a surge tank adapted to receive water containing oil which separates into a lower water phase and an upper oil phase within said tank, means for withdrawing water from said tank, a conduit extending from the interior to the exterior of said tank for the separate withdrawal of oil therefrom, said conduit having an inlet in fluid communication with the interior of said tank, means for maintaining said conduit inlet spaced a fixed distance above the interface between said oil and water phases whereby the thickness of said oil phase remains constant as the elevation of said interface varies, said last-named means comprising a buoy to which said conduit is secured, said buoy having a density between the densities of oil and water and being adapted to float at the interface between the oil and water phases whereby said conduit inlet is supported above the interface by said buoy at said fixed distance, and means for intermittently allowing said tank to fill with water to a predetermined upper level therein and thereafter emptying water from said tank to a predetermined lower level therein.

3. The system of claim 2 further comprising a water inlet line opening into said tank at a location below said predetermined lower level.

* * * * *